Jan. 2, 1945.   J. D. RAUCH   2,366,558
CRANE TURNTABLE
Original Filed Oct. 25, 1941   2 Sheets-Sheet 1

Inventor
John D. Rauch
By Robert Cobb
Attorneys

Jan. 2, 1945. J. D. RAUCH 2,366,558
CRANE TURNTABLE
Original Filed Oct. 25, 1941 2 Sheets-Sheet 2

Inventor
John D. Rauch
By Robert Cox
Attorneys

Patented Jan. 2, 1945

2,366,558

UNITED STATES PATENT OFFICE 2,366,558

CRANE TURNTABLE

John D. Rauch, Fort Wayne, Ind.

Original application October 25, 1941, Serial No. 416,557, now Patent No. 2,343,800, dated March 7, 1944. Divided and this application January 8, 1944, Serial No. 517,562

1 Claim. (Cl. 212—69)

This application is a division of my copending application for patent Serial No. 416,557, filed October 25, 1941, now Patent No. 2,343,800 granted March 7, 1944.

My invention relates to what are generally known as revolving or full circle cranes of the power shovel, dragline, clamshell, and hoisting types.

The primary object of my invention has been to provide novel means for mounting the rotating platform of a revolving crane structure upon the supporting member of the vehicle, wherein the platform is rotatively supported upon ball bearings and adjustable hook-under rollers are provided on the platform for cooperation with a part of the supporting member for securing the platform rotatively to said member.

A full understanding of my invention will be had on reference to the following detailed description and to the accompanying drawings, in which:

Figure 5 is a sectional view showing in detail the hook-under roller and bracket assembly and the manner in which the same is mounted upon the rotating platform.

Figure 1:
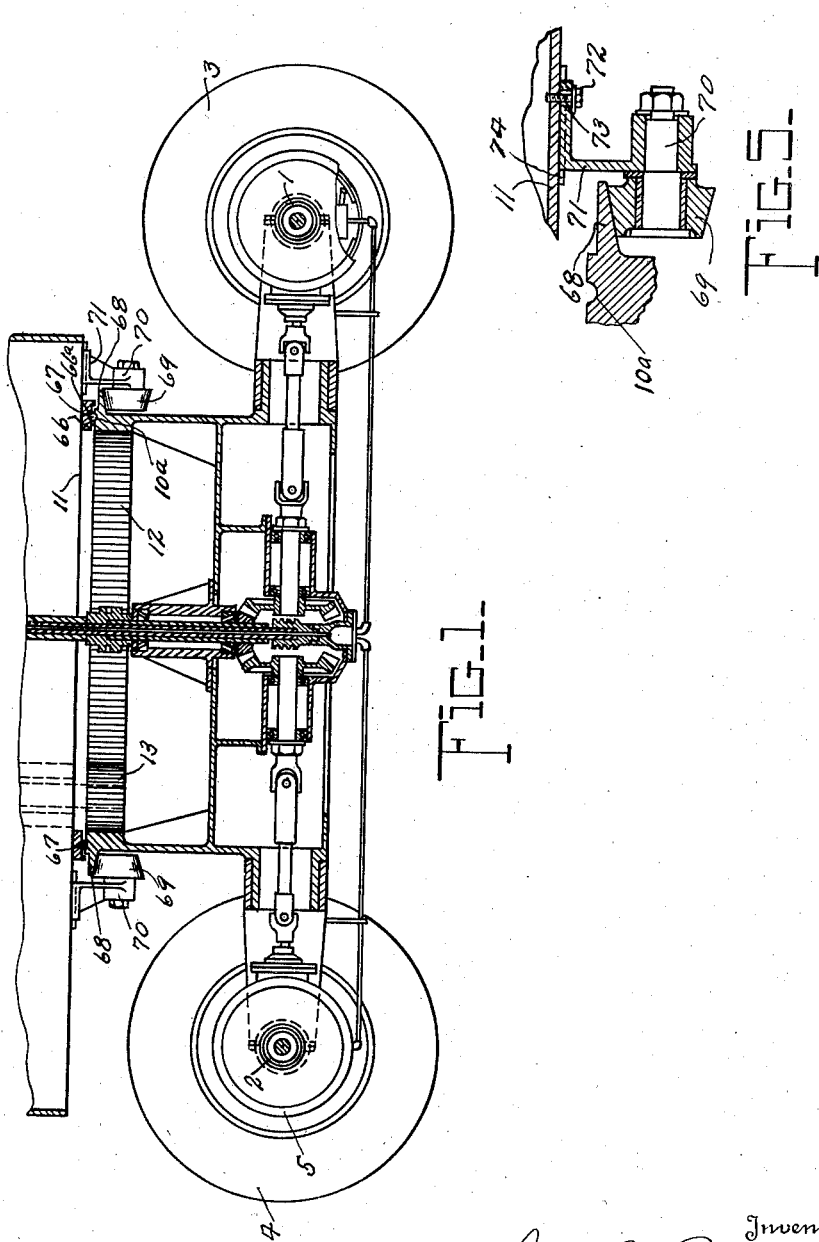
Figure 1 is a fragmentary sectional view of the revolving body of the crane as mounted on its wheeled supports, though other types of traction may be employed, and disclosing the rotative mounting means for the body on the turntable support of the support or running gear.
Figure 2:
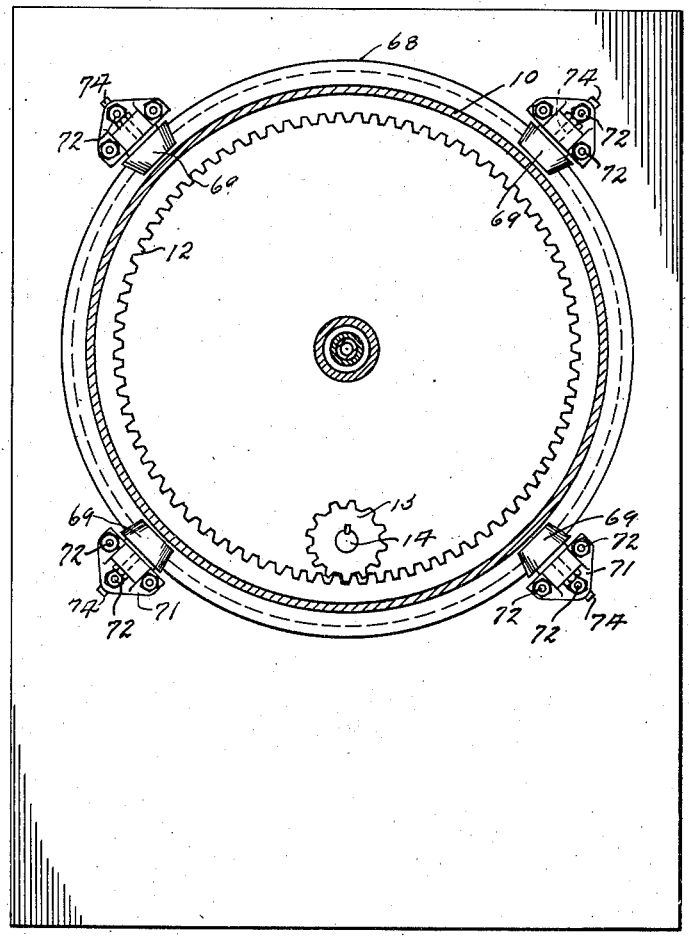
Figure 2 is a bottom reflected view of the rotating platform and a part of the body supporting member, the latter being shown in section and certain other parts in section, said view showing the disposition of the bearing means interconnecting the rotating platform with the body supporting member.
Figure 3:
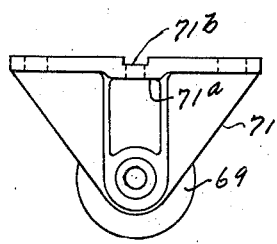
Figure 3 is an end view of parts shown in Figure 5, looking toward the left respecting Figure 5.
Figure 4:
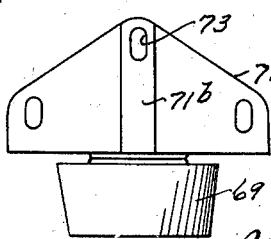
Figure 4 is a top view of parts shown in Figure 5.

Referring to the drawings and specifically describing the invention, it is notable that the illustration given is for an adaptation of the invention to so-called power cranes of the shovel, dragline or clamshell types wherein there is usually employed a revolving crane body.

The construction shown comprises the front axle 1 and rear axle 2 which may be of a conventional type including axle housings in which drive shafts are mounted for driving the front wheels 3 from the front axle unit 1 and the rear wheels 4 from the rear axle unit 2. Each of these axle units 1 and 2 is equipped with transmission gearing, as illustrated, received in the customary housings 5 of conventional construction. The front wheel unit 1 is connected with the rear wheel unit 2 by means of side frame or chassis members of like form, the front ends of the members being connected by ball and socket joints with the axle unit 1, and the rear ends of side frame members being connected to the rear axle unit 2 by similar ball and socket joints. The ball and socket joints are formed by split bearing portions provided at the ends of the frame members and by forming the ball elements on the axle housings 1 and 2. The joints provide for a certain amount of universal movement intermediate the parts of the chassis and running gear.

There is provided a body supporting member 10 designed to be carried by the frame and axle and wheel assembly above described, said body supporting member according to the illustration of the drawings being designed for carrying the rotating platform 11 of a revolving crane structure. With this purpose in mind, therefore, the supporting member 10 has a circular configuration and comprises an internal swing gear 12, in this instance designed to be stationary relatively to the platform and being engaged by the usual swing pinion 13 carried by the platform 11 and directly mounted upon the swing shaft 14 supported on the platform. The platform 11, of course, will carry the crane body or housing such as customarily employed for enclosing the crane operating mechanism by which the excavating instrumentalities of the crane are actuated, this mechanism housing including certain drum and cable equipment. Likewise, the controls for the operation of driving the vehicle and steering it and for braking the wheels, will be mounted in the crane body. In certain types of revolving cranes no crane body or housing construction is required, under which conditions this feature of the vehicle of my invention may be omitted.

Likewise, it is to be understood that within the purview of the invention the body supporting member 10 may support a tank body or any other kind of super-structure such as found useful in this art. Where the tank body may comprise a revolving turret the supporting member 10 may comprise the gear structure illustrated and the swing pinion and shaft features may be used for accomplishing the revolution of the turret structure.

The details of the traction support shown are not material to the present invention and are set forth in the application above identified. This also applies to the transmission and wheel driving features illustrated but not described.

I now describe the novel method of mounting the rotating platform 11 upon the supporting member 10 which I find to be highly advantageous. The structure shown in the drawings avails of both ball bearings and what I call hook-under rollers for the mounting of the rotating platform 11 upon the supporting member 10. According to the embodiment of my invention illustrated herein, the rotating platform 11 is supported relative to the supporting member 10 upon ball bearings, and a plurality of adjustable hook-under roller members are provided on the platform 11 for cooperation with a part of the supporting member 10 to prevent separation of the platform from said supporting member while enabling the platform to rotate relatively to the supporting member.

As shown in the drawings, the upper side of the supporting member 10 is provided with an annular groove 10a, and secured to the under side of the platform 11 is a ring 66 likewise provided with a similar corresponding annular groove 66a. These grooves 10a and 66a provide a race for ball bearings 67 which are provided in the groove 10a so that the weight of the platform 11 is rotatively supported on said balls.

The supporting member 10 is provided with an annular flange 68 and there are provided at the under side of the platform 11 a plurality of spaced rollers 69 mounted on the stub-shaft 70 journaled in angle brackets 71 secured to the under side of the platform 11 by suitable bolts 72. These rollers 69 are adapted to engage the under edge of the annular flange 68 so as to secure the platform 11 rotatively to body supporting member 10, or, in other words, to prevent separation of the parts 11 and 10 while permitting relative rotation thereof. The angle brackets 71 are preferably provided with elongated slots 73 through which the securing bolts 72 pass into the under side of the platform 11.

The purpose of providing the elongated slots in the angle brackets 71 is to provide for adjustment of the rollers 69 inwardly toward the body supporting member 10 to take up for wear. It will be noted that the under side of the flange 68 is tapered upwardly outwardly, and the rollers 69 are each provided with a correspondingly tapered or conical periphery. As the rollers 69 and flange 68 wear in use, the resulting play may be taken up or eliminated by loosening the bolts 72 and moving the bracket 71 relatively to bolts 72 by reason of the elongated slot 73, so that the rollers 69 more closely engage the tapered under edge of the flange 68.

Any desired number of the hook-under roller members each comprising a bracket 71 and a roller 69 mounted on a stub-shaft 70 journaled in said bracket may be availed of, but I find that the use of four of such members provided on the platform 11 so as to cooperate with the supporting member 10 at points equally spaced therearound is quite satisfactory.

Each of the brackets 71 has its upper leg 71a provided with a groove 71b extending in the direction of the axis of rotation of the roller 69 relative to its bracket 71. In this groove 71b is guidingly received one of the bars 74 which are welded to the bottom of the platform 11 and radially disposed relative to the center of rotation of the platform 11 respecting the supporting member 10. The provision of the radially disposed bars 74 cooperating with the grooves 71b of their respective brackets 71 serves to guide the brackets radially relative to the center of rotation of the platform 11 respecting the supporting member 10 for proper adjustment of the roller members relative to the flange 68.

It will be noted that the means for rotatively mounting the platform 11 relative to the supporting member 10 just described eliminates the necessity for a center pin such as commonly used in similar types of crane construction wherein the crane body or super-structure is adapted to rotate relative to the supporting structure. The provision of my invention for adjustability of the roller members to take up play caused by wear of the parts functions to center the platform 11 rotatively relative to the base and eliminates the need for a center pin to center the relatively rotating parts, which center pin would otherwise be required were it not for the adjutability of the roller member of my construction to take up for wear.

My contruction for mounting the platform rotatively relative to the supporting member also has advantages in reference to ease of assembly of the rotating member 11 relative to the supporting member 10 by reason of the fact that the ball bearings 67 may be emplaced in the annular groove 10a, the body 11 then placed in supporting position upon the ball bearings, and then the brackets 71 carrying the roller members 69 may afterwards be bolted in position and properly adjusted for cooperation with the flange 68. The bolts 72 for adjustment of the roller members are readily accessible for adjustment of the brackets carrying the same, as will be apparent.

Having thus described my invention what I claim as new and desire to secure by Letters Patent of the United States, is:

In vehicle structure of the class described, in combination, a body supporting member, a body member, bearing means intermediate said members for rotatively supporting the body member relative to the supporting member, and other bearing means carried by the body member and cooperable with said supporting member for maintaining said members against vertical separation, said other bearing means comprising rollers the peripheries of which are of like conical taper for engagement with the under side of said flange, and means for adjusting said rollers including guide members carried by the body member and disposed radially relative to the axis of rotation thereof, and guiding means for each of said rollers and disposed parallel to the axis of rotation of its respective roller and cooperable with the guide members for movement of the rollers in the direction of their respective axes radially respecting the axis of rotation of the body member, said supporting member and said body member provided with mating annular grooves concentric with the axis of rotation of the body member, and said first mentioned bearing means comprising ball bearings received in said grooves.

JOHN D. RAUCH.